United States Patent

Hiraoka

[11] Patent Number: 5,844,391
[45] Date of Patent: Dec. 1, 1998

[54] DEVICE FOR CONTROLLING THE CLAMPING FORCE OF A MOTOR-DRIVEN INJECTION MOLDING MACHINE

[75] Inventor: Kazuo Hiraoka, Chiba, Japan

[73] Assignee: Sumitomo Heavy Industries, Ltd., Tokyo, Japan

[21] Appl. No.: 870,494

[22] Filed: Jun. 6, 1997

[30] Foreign Application Priority Data

Mar. 26, 1996 [JP] Japan ........................................ 8-69682

[51] Int. Cl.⁶ ............................................ H02P 3/00
[52] U.S. Cl. ................................ 318/566; 318/432
[58] Field of Search .......................... 318/432, 434, 318/566, 798–815, 685, 696; 364/174; 361/23, 25, 33

[56] References Cited

U.S. PATENT DOCUMENTS

| | | | |
|---|---|---|---|
| 4,131,596 | 12/1978 | Allen . | |
| 4,506,321 | 3/1985 | Comstock et al. | 364/174 |
| 4,714,867 | 12/1987 | Palmin et al. | 318/696 |
| 5,274,316 | 12/1993 | Evans et al. | 318/696 |
| 5,313,151 | 5/1994 | Ogden et al. | 318/805 |
| 5,341,452 | 8/1994 | Ensor | 388/811 |
| 5,362,222 | 11/1994 | Faig et al. | 425/145 |
| 5,444,341 | 8/1995 | Kneifel II et al. | 318/432 |
| 5,583,411 | 12/1996 | Kusano et al. | 318/719 |

FOREIGN PATENT DOCUMENTS

| | | |
|---|---|---|
| 0 649 721 A1 | 4/1995 | European Pat. Off. . |
| 36 31 164 A1 | 6/1987 | Germany . |
| 58-107259 | 6/1983 | Japan . |
| 61-014926 | 1/1986 | Japan . |
| 63-102917 | 5/1988 | Japan . |
| 3-162916 | 7/1991 | Japan . |
| 2 218 033 | 11/1989 | United Kingdom . |

*Primary Examiner*—Jonathan Wysocki
*Attorney, Agent, or Firm*—Burns, Doane, Swecker & Mathis, LLP

[57] ABSTRACT

A control device for an injection molding machine includes a pattern generator for generating a set pattern of clamping forces. The pattern generating calculates a travel distance of a movable member in the mold clamping system according to the set clamping force and generates the set pattern having an allowable range of deviation that is defined by an upper limit and a lower limit relative to the calculated travel distance. The mold clamping system continuously decreases the clamping such that it falls within the range defined by the allowable range of deviation after the clamping force reaches the value defined by the upper limit.

4 Claims, 3 Drawing Sheets

DEVICE FOR CONTROLLING THE CLAMPING FORCE OF A MOTOR-DRIVEN INJECTION MOLDING MACHINE

BACKGROUND OF THE INVENTION

The present invention relates to a control device for a motor-driven injection molding machine. More particularly, the present invention relates to a control device for a mold clamping system used for clamping an article with a toggle mechanism that is driven by a servo-motor.

A mold clamping system for an injection molding machine comprises a servo-motor, a ball screw, and a toggle mechanism. The servo-motor has a predetermined rated torque. The ball screw has a screw shaft and a nut to convert rotation of the servo-motor into rectilinear motion. The rotation of the servo-motor is transmitted to the screw shaft. In response to this, the screw shaft rotates and the nut moves forward, allowing the toggle mechanism to achieve clamping.

Molding of resins typically involves in a plurality of processes, i.e., dispensing a resin, filling, dwelling, and cooling. Besides these processes, the mold clamping system carries out a clamping process. In the mold clamping system, a torque of the servo-motor is controlled during the clamping process in order to provide a clamping force of which profile exhibits a predetermined pattern or patterns.

Conventional mold clamping systems generate a torque that is approximately equal to a maximum torque when a set clamping force is generated. Such a maximum torque is determined depending on the rating. In addition, the torque that is approximately equal to the maximum torque is kept until completion of the clamping process. The rating of the servo-motor is determined while taking into consideration a coefficient of friction between individual components forming the toggle mechanism.

The conventional mold clamping systems at any rate maintain the maximum torque generated by the servo-motor from the beginning to the end of the clamping process. This consumes a significant amount of electric power.

SUMMARY OF THE INVENTION

Accordingly, an object of the present invention is to provide a control device for a motor-driven injection molding machine that is capable of maintaining a set clamping force with less consumption of electric power.

The present invention is applicable to a control device for a motor-driven injection molding machine that comprises a mold clamping system having a servo-motor and a ball screw mechanism in which the ball screw mechanism comprises a screw shaft and a nut for use in converting rotation of the servo-motor into rectilinear motion.

According to an aspect of the present invention, the control device comprises a pattern generator for generating a set pattern for the clamping force. The screw shaft rotates as necessary to generate the set clamping force, plus an amount of rotation necessary to generate an additional amount of clamping force that corresponds to a predetermined allowable range of deviation until a predetermined upper limit is reached. The clamping system may then rotate the screw shaft in the reverse direction during a predetermined clamping time interval such that the clamping force falls within the range defined by the allowable range of deviation and is less than the predetermined upper limit.

DESCRIPTION OF THE PREFERRED EMBODIMENT

Figure 1:
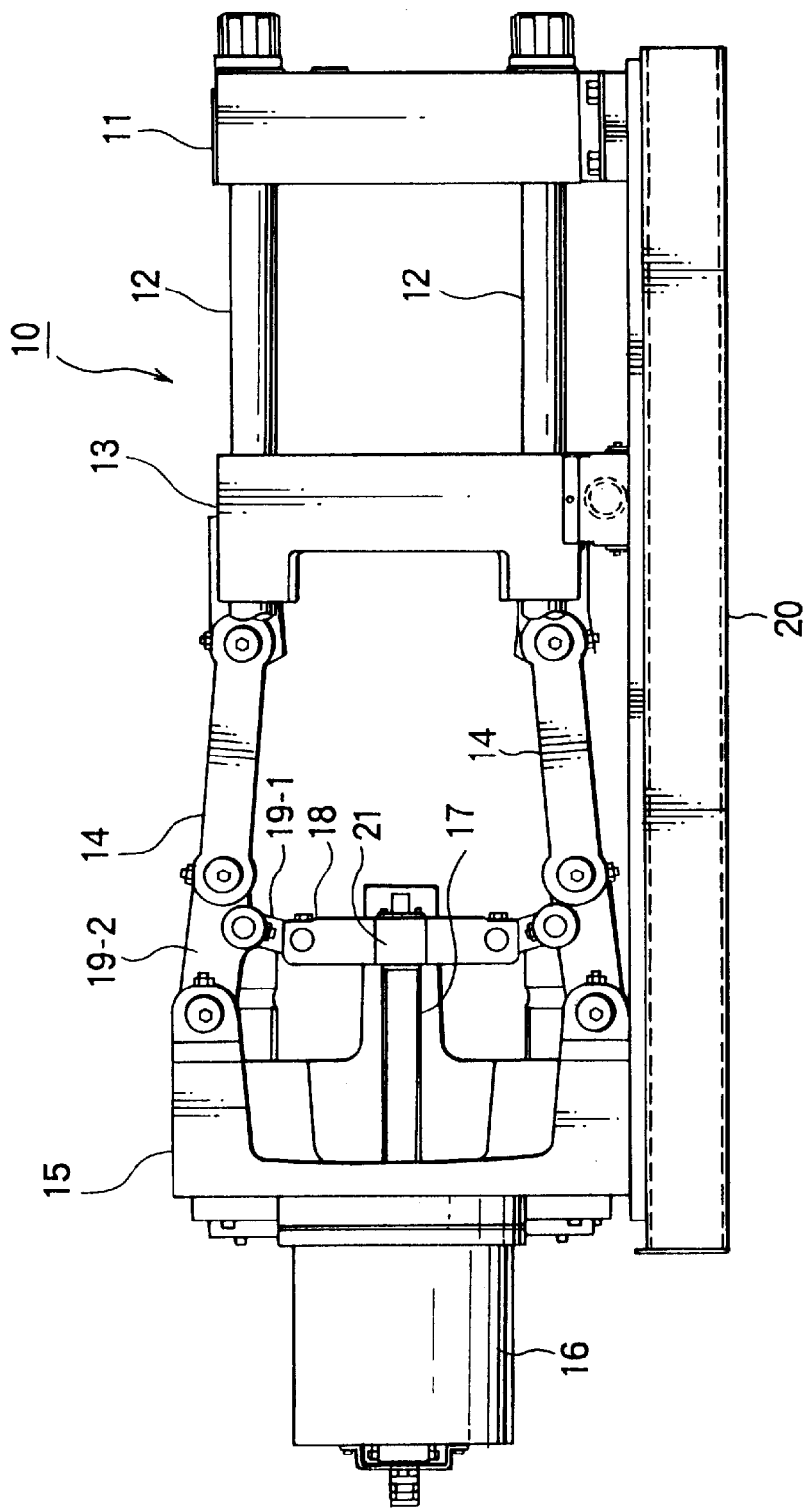
FIG. 1 is a view illustrating a structure of the essentials of a mold clamping system to which the present invention is applied.
Figure 2:
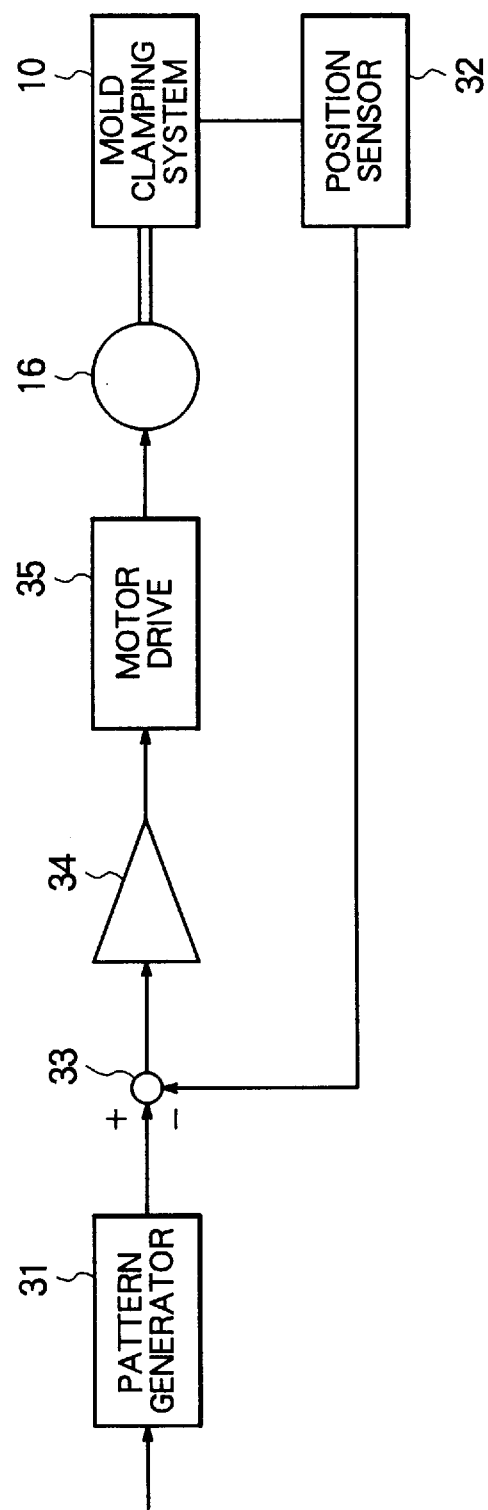
FIG. 2 is a block diagram illustrating a structure of a control device for a mold clamping system according to the present invention.

Referring to FIG. 1, a mold clamping system in a motor-driven injection molding machine is described. In FIG. 1, a mold clamping system 10 comprises a fixed platen 11, four tie bars 12, a movable platen 13, two arms 14, a toggle support 15, a servo-motor 16, a screw shaft 17, a cross head 18, a first toggle lever 19-1, and a second toggle lever 19-2. Only two tie bars 12 are illustrated in FIG. 2. A toggle mechanism is formed of the two arms 14, the toggle support 15, the cross head 18, and the first and the second toggle levers 19-1 and 19-2. While not illustrated, the fixed and the movable platens 11 and 13 are attached to fixed and movable mold, respectively, such that they are opposed to each other. The fixed platen 11 is securely fixed to a base plate 20. The movable platen 13 slides on the four tie bars 12 depending on the position of the two arms 14.

Rotation of the servo-motor 16 is transmitted to the screw shaft 17. A nut 21 is thread-engaged with the screw shaft 17. Rotation of the screw shaft 17 results in forward movement of the nut 21, which causes the toggle mechanism to achieve the clamping operation.

The clamping force is kept by means of moving the movable mold to the position required for keeping the set clamping force. The two arms 14 of the toggle mechanism are not fully extended when the set clamping force is generated in the mold clamping system 10. Instead, the arms 14 are just short of the fully extended status in order to avoid so-called "deadlock" of the toggle mechanism. The deadlock is a status where the two arms 14 are locked with being fully extended and neither can be returned to the original position at all. The deadlock will occur only when the two arms 14 are fully extended. More specifically, the toggle mechanism will be locked due to a frictional force when a clamping force exceeds a certain limit provided during the normal use of the system, with the two arms 14 being fully extended.

The servo-motor 16 generates a torque that is approximately equal to a maximum torque, which is determined depending on the rating, when the set clamping force is provided in the mold clamping system 10. In addition, the torque that is approximately equal to the maximum torque is kept until completion of the clamping process.

As described above, the conventional mold clamping system at any rate maintains the maximum torque generated by the servo-motor 16 from the beginning to the end of the clamping process. This consumes a significant amount of electric power.

Figure 3:
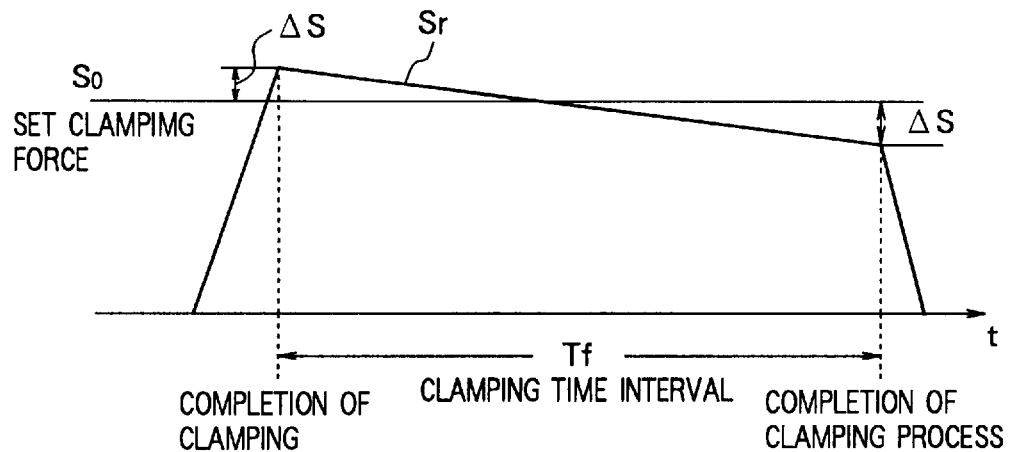
FIG. 3 is a view showing an example of a set pattern generated by a set pattern generator illustrated in FIG. 2.

Referring to FIG. 2, it is described a control device for a mold clamping system according to a preferred embodiment of the present invention. The control device comprises a pattern generator 31. The pattern generator 31 generates a set pattern Sr as illustrated in FIG. 3. The pattern generator 31 produces an instruction signal indicative of an instructed value in accordance with the set pattern Sr generated. In FIG. 3, the clamping force is illustrated as a position of the cross head 18 in the mold clamping system because the profile of the clamping force reflects that of the displacement of the cross head 18. The control device further comprises a position sensor 32 for use in sensing a position of the cross head 18. The position sensor 32 produces a position sensor signal indicative of the sensed position. A subtracter 33 calculates a difference between the instruction signal supplied from the pattern generator 31 and the position sensor signal obtained by the position sensor 32. The subtracter 33 then supplies a calculated difference signal indicative of the difference to an amplifier 34. The amplifier 34 has functions including PID compensation. The amplifier 34 amplifies the calculated difference signal and produces a torque instruction signal indicative of an instructed torque value for the servo-motor 16. A motor drive 35 drives the servo-motor 16 in accordance with the instructed torque value provided by the amplifier 34.

In FIG. 3, features of the present invention lie in the following. The pattern generator 31 calculates, in response to application of the set clamping force, an amount of displacement of the cross head 18 that is required to generate the set clamping force as a travel distance S0. A deviation ΔS is determined depending on the allowable range of deviation within which the clamping force may change.

The set pattern Sr is generated such that the travel distance of the cross head 18 reaches the upper limit, i.e., (S0+ΔS), upon completion of the clamping. Furthermore, the travel distance should be smaller than the upper limit of (S0+ΔS) during a clamping time interval Tf before the end of the clamping process and be within the deviation of 2ΔS from the upper limit of (S0+ΔS).

With such a set pattern Sr, the screw shaft 17 rotates by an amount of rotation necessary for generating the set clamping force plus the amount of rotation corresponding to the allowable range of deviation for the clamping force (corresponding to the distance ΔS). This allows the mold clamping system 10 to generate the clamping force that is larger than the set clamping force by the amount corresponding to the allowable range of deviation. The screw shaft 17 is continuously rotated within the range between the upper limit (S0+ΔS) and the lower limit (S0−ΔS) in the reverse direction during the clamping time interval of Tf.

As described above, the screw shaft 17 is rotated in the reverse direction in the range (usually ±1% of the set clamping force) within which the deviation of the clamping force is allowed, once the set clamping force is achieved. As a result, the torque of the servo-motor 16 can be decreased while taking the advantages of the negative efficiency of the screw shaft 17 or the toggle mechanism.

Figure 4:
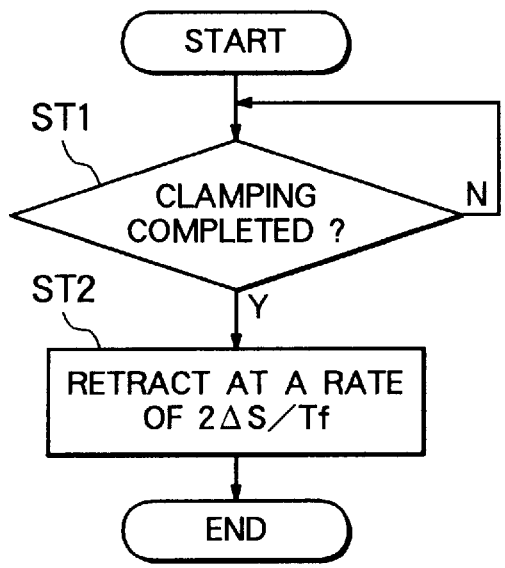
FIG. 4 is a flow chart for use in describing operation of the control device illustrated in FIG. 2.

Referring to FIG. 4, the control device determines, at step S1 at the beginning of the clamping, whether the value Sr(t) of the set pattern Sr exceeds the upper limit (S0+ΔS) to determine whether the clamping is completed. When determining that the clamping is completed, the control device rotates the screw shaft 17 in the reverse direction at step S2 to retract gradually the movable mold at a rate of 2ΔS/Tf. The value Sr(t) that is t (time) after the completion of the clamping is given by the equation: (S0+ΔS−2ΔS*t/Tf).

As mentioned above, the control device according to the present invention provides the clamping force that is larger than the set clamping force and is within the allowable range of deviation upon completion of the clamping. The control device then continues to decrease the clamping force within the allowable range of deviation during the subsequent clamping time by means of rotating the screw shaft 17 in the reverse direction. Accordingly, the torque of the servo-motor 16 can be decreased. In other words, it is possible to maintain the clamping force at or around the set clamping force only by applying a micro-current.

The present invention has thus been described in conjunction with a preferred embodiment thereof in which the position sensor 32 senses the position of the cross head 18 in the mold clamping system. However, the position sensor 32 may sense a position of other movable member in the mold clamping system. Examples of such other movable member include the nut 21 and the movable mold.

What is claimed is:

1. A control device for a motor-driven injection molding machine that comprises a mold clamping system having a servo-motor and a ball screw mechanism in which the ball screw mechanism comprises a screw shaft and a nut for use in converting rotation of the servo-motor into rectilinear motion, wherein:

the control device comprises a pattern generator for generating a set pattern for the clamping force, said pattern generator calculating, in response to application of the set clamping force, a travel distance S0 of a predetermined movable member in the mold clamping system according to the set clamping force, generating the set pattern having an allowable range of deviation 2ΔS that is defined by an upper limit (S0+ΔS) and a lower limit (S0−ΔS) relative to the travel distance S0 calculated, said mold clamping system continuously decreasing, by rotating the screw shaft in the reverse direction during a predetermined clamping time interval Tf, such that the clamping force is within the range defined by the allowable range of deviation 2ΔS, after the clamping force reaches the value defined by the upper limit (S0+ΔS).

2. A control device for a motor-driven injection molding machine as claimed in claim 1, wherein a rate of decrease of the clamping force is given by 2ΔS/Tf.

3. A control device for a motor-driven injection molding machine as claimed in claim 1, further comprising a position sensor for sensing the position of a movable member of the injection molding machine, a subtractor for calculating the difference between a signal supplied by the pattern generator and a signal supplied by the position sensor, an amplifier for amplifying the calculated difference signal and supplying the difference signal to a motor drive, the motor drive driving the servo-motor in accordance with the calculated difference signal supplied by the amplifier.

4. A control device for a motor driven injection molding machine as claimed in claim 1, wherein the screw shaft is rotated in the reverse direction on the order of plus or minus one percent of the said clamping force.

* * * * *